United States Patent [19]

Saitoh et al.

[11] Patent Number: 4,766,491
[45] Date of Patent: Aug. 23, 1988

[54] ADAPTOR FOR A VIDEO MONITORING SYSTEM

[75] Inventors: Mitsumasa Saitoh; Naoyuki Sumi; Susumu Tagawa, all of Tokyo, Japan

[73] Assignee: Sony Corporation, Tokyo, Japan

[21] Appl. No.: 49,429

[22] Filed: May 14, 1987

[30] Foreign Application Priority Data

May 30, 1986 [JP] Japan .................. 61-125125

[51] Int. Cl.$^4$ .............................................. H04N 7/18
[52] U.S. Cl. ................................... 358/108; 358/181; 358/185
[58] Field of Search ............. 358/108, 181, 185, 229, 358/93, 86, 87, 190, 98

[56] References Cited

U.S. PATENT DOCUMENTS

| | | | |
|---|---|---|---|
| 4,037,250 | 7/1977 | McGahan et al. | 358/185 X |
| 4,577,229 | 3/1986 | de la Cierva, Sr. et al. | 358/181 X |
| 4,673,974 | 6/1987 | Ito et al. | 358/86 X |
| 4,700,230 | 10/1987 | Pshtissky et al. | 358/185 X |

FOREIGN PATENT DOCUMENTS

61-269586 11/1986 Japan .

Primary Examiner—Howard W. Britton
Assistant Examiner—Victor R. Kostak
Attorney, Agent, or Firm—Ronald P. Kananen

[57] ABSTRACT

A video monitoring system applicable to a security system is provided with a television camera, one or more television monitors, one or more AC adaptors equal in number to the television monitors, and one or more adaptors equal in number to the television monitors. Each adaptor connects the television camera to the associated television monitor via a prior stage component of the monitoring system and to a next stage component. At least one of the adaptors has functions for transmitting DC power supply of the associated AC adaptor to the associated television monitor, for transmitting DC power supply to the prior stage component via the associated television monitor, for transmitting and amplifying an audio signal of the television camera to the associated television monitor and to the next stage component, for transmitting and amplifying a video signal of the television camera to the next stage component upon receipt of DC power supply from the next stage component, and for transmitting the video signal from the prior stage component to the associated television monitor.

20 Claims, 4 Drawing Sheets

ADAPTOR FOR A VIDEO MONITORING SYSTEM

BACKGROUND OF THE INVENTION

The present invention relates to video monitoring systems which employ one or more monitor television screens and one or more television cameras.

There is an increasing demand for video monitoring systems which can be employed for security systems in houses, offices, warehouses, government, buildings and the like to prevent theft, unauthorized entry, and so forth.

Almost all video monitoring systems are expensive and use large television cameras and television monitors. Therefore, relatively large constructions are required to support them.

A video monitoring system kit which can easily be installed in such locations as houses has been proposed in a Japanese Patent Application First Publication (Tokkai) sho No. 61-269586 published on Nov. 28, 1986. The video monitoring system kit in the above-identified Japanese Patent Application document includes a small television camera, a small television monitor, and a connector cable. These components are packaged in such a way that users can easily install the system components at the required places. Usually with this type of system, the television camera is focused on the area to be monitored and connected to the television monitor via the cable so that video images may be transmitted to the latter.

The camera operates on a low DC voltage that is supplied to it from an AC-DC converter in the television monitor i.e., an AC adaptor connected to a receptacle of a commercial AC power supply. If it is desirable to view the image produced by the camera by means of a second video monitor installed, for example, at a location other than the location of the first television monitor, the video signal input of the second television monitor is connected to the video signal output of the first television monitor.

There is a problem with the system described above in that, in order to view an image output by the camera on the second television monitor, the power supplies of both the first and second television monitors must be turned on because the camera receives its power from the AC-DC converter of the first television monitor and also the second television monitor is dependent on the first video monitor to output a signal from its video signal output. Furthermore, if a third television monitor is to be employed, the power supplies of all three television monitors must be turned on in order to view the image output from the camera on it since the video signal input of the third television monitor must be connected to the video signal output of the second television monitor which in turn is similarly connected to the first television monitor which is connected directly to the camera. Still another disadvantage of this arrangement is that the image output by the camera deteriorates at each stage in the series so that as more television monitors are added to the system, the quality of the image seen on the last monitor in series accordingly becomes worse.

These problems may be solved by means of a signal distributing device in which a plurality of amplifiers are built and a DC voltage supply (AC adaptor) is connected to all amplifiers. The signal distributing device supplies the video camera with the low DC voltage and receives therefrom a video signal. The inputs of the amplifiers are connected in parallel at input of the signal distributing device for receiving the signal output from the camera and the outputs thereof are connected to a plurality of output jacks through which a video signal can be output to a plurality of television monitors. In this way, each of the television monitors receives an equally clear signal. However, in this type of system, the number of television monitors is limited by the number of output jacks on the signal distributing device.

In addition, a high power AC adaptor i.e., an (AC-DC converter) needs to be connected to the distributing device with power supplies of all amplifiers taken into account.

SUMMARY OF THE INVENTION

It is a first object of the present invention to provide a video monitoring system applicable to a security system for such as houses.

It is a second object of the present invention to provide a video monitoring system which is simple in construction and in which it is easy to install system components at required spaces.

It is a third object of the present invention to provide a video monitoring system which enables the power supplies of all television monitors and television cameras in response to a detection of entry of a foreign object, such as a human being, into an area to be monitored.

It is a fourth object of the present invention to provide a video monitoring system which enables a power supply for the television camera via at least one powered television monitor.

It is a fifth object of the present invention to provide a video monitoring system which can transmit a video signal from the television camera to all television monitors without signal deterioration.

It is a sixth object of the present invention to provide a video monitoring system which can interconnect an arbitrary number of television monitors without special high power supplies.

The above-described objects can be achieved by providing a video monitoring system, comprising: (a) at least one television camera; (b) at least one television monitor; (c) a DC power supply for the television monitor; and (d) an adaptor for connecting the television camera to the television monitor, the adaptor including, (e) first means for transmitting the DC power supply to the television monitor; (f) second means for transmitting the DC power supply to a prior stage component of the adaptor in the monitoring system via the television monitor; (g) third means for transmitting a command signal to feed a power supply for the television camera from the DC power supply; (h) fourth means for feeding the DC power supply via the prior stage component of the adaptor to the television camera in response to the command signal transmitted by the third means; and (i) fifth means for transmitting the video signal of the television camera from the prior stage component to the television monitor.

The above-described objects can also be achieved by providing a video monitoring system, comprising: at least one television camera, a plurality of television monitors, and AC adaptors, each for converting an AC voltage to a DC voltage and supplying the DC voltage to the associated television monitor, and a plurality of adaptors, each adaptor for connecting the television camera to the associated television monitor via a prior stage component of the monitoring system and to a next stage adaptor, at least one of the adaptors including: (a) first means for transmitting the DC power supply of the associated AC adaptor to the associated television monitor; (b) second means for transmitting the DC power supply of the associated AC adaptor to the prior stage component via the associated television monitor; (c) third means for transmitting and amplifying an audio signal of the television camera to the associated television monitor and to the next stage adaptor; (d) fourth means for receiving the DC power supply from the next stage adaptor and for transmitting and amplifying a video signal of the television camera to the next stage adaptor and transmitting the associated DC power supply of the AC adaptor to the prior stage component upon receipt of the DC power supply from the next stage adaptor; and (d) fifth means for transmitting the video signal of the television camera from the prior stage component to the associated television monitor.

The above-described objects can also be achieved by providing an adaptor for a video monitoring system, comprising: (a) first means for transmitting a power supply from an AC adaptor for converting an AC voltage into a DC voltage to a television monitor connected to the adaptor; (b) second means for transmitting the power supply from the AC adaptor to a prior stage component in the monitoring system; (c) third means for transmitting an audio signal of a television camera and a command signal from the first stage component to turn on a power supply for the television camera to a next stage component; (d) fourth means for directly transmitting the power supply to the prior stage component when the third means transmits the command signal to the next stage component; (e) fifth means for receiving the power supply from the next stage component and for amplifying and transmitting a video signal of the television camera from the prior stage component to the next stage component and directly transmitting the power supply from the AC adaptor to the prior stage component when the power is supplied from the next stage component; and (f) sixth means for transmitting the video signal of the television camera from the prior stage component to the television monitor connected to the adaptor.

The above-described objects can also be achieved by providing an adaptor for a video monitoring system, comprising: (a) a first connection terminal group via which a video signal of a television camera from a prior stage component of the monitoring system is transmitted to the internal adaptor and via which a power supply command signal from the prior stage component is transmitted to the internal adaptor; (b) a second connection terminal group via which the video signal passed through the first connection terminal group is transmitted to a television monitor connected to the adaptor, and via which a power supply is transmitted to the television monitor; and (c) a third connection terminal group via which the video signal from the prior stage component is transmitted to a next stage component of the monitoring system, via which the power supply command signal is transmitted to the next stage component, and via which a power supply from the next stage component is received so that the power supply for the prior stage component is transmitted to the prior stage component via the first connection terminal group, and the third connection terminal group transmitting the video signal of the television camera via the first connection terminal group to the next stage component with amplification by means of an amplifier which receives the power supply therefor via the third connection terminal group from the next stage component.

DETAILED DESCRIPTION OF THE PREFERRED EMBODIMENT

Reference will hereinafter be made to the drawings in order to facilitate an understanding of the present invention.

FIGS. 1 through 4(F) show a preferred embodiment of a video monitoring system having adaptors according to the present invention.

Figure 1:
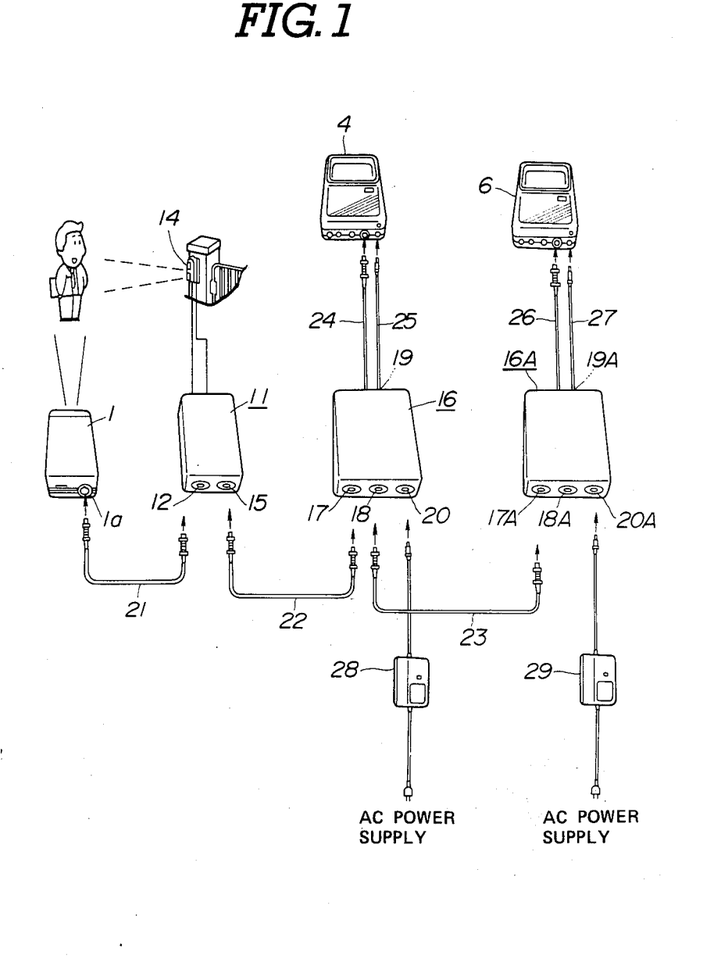
FIG. 1 is a system configuration of a preferred embodiment of a video monitoring system according to the present invention.

As shown in FIG. 1, a television camera 1 is connected to a rosette 11 via a cable 21. A first adaptor 16 is connected to the rosette 11 via a cable 22. The adaptor 16 is connected to a first monitor television 4 via two cables 24 and 25. In addition, the first adaptor 16 is connected to a second adaptor 16A via a cable 23. The second adaptor 16A is connected to a second monitor television 6 via cables 26 and 27. The adaptor rosette may be compatible with both the first and second adaptors 16 and 16A.

Figure 2:
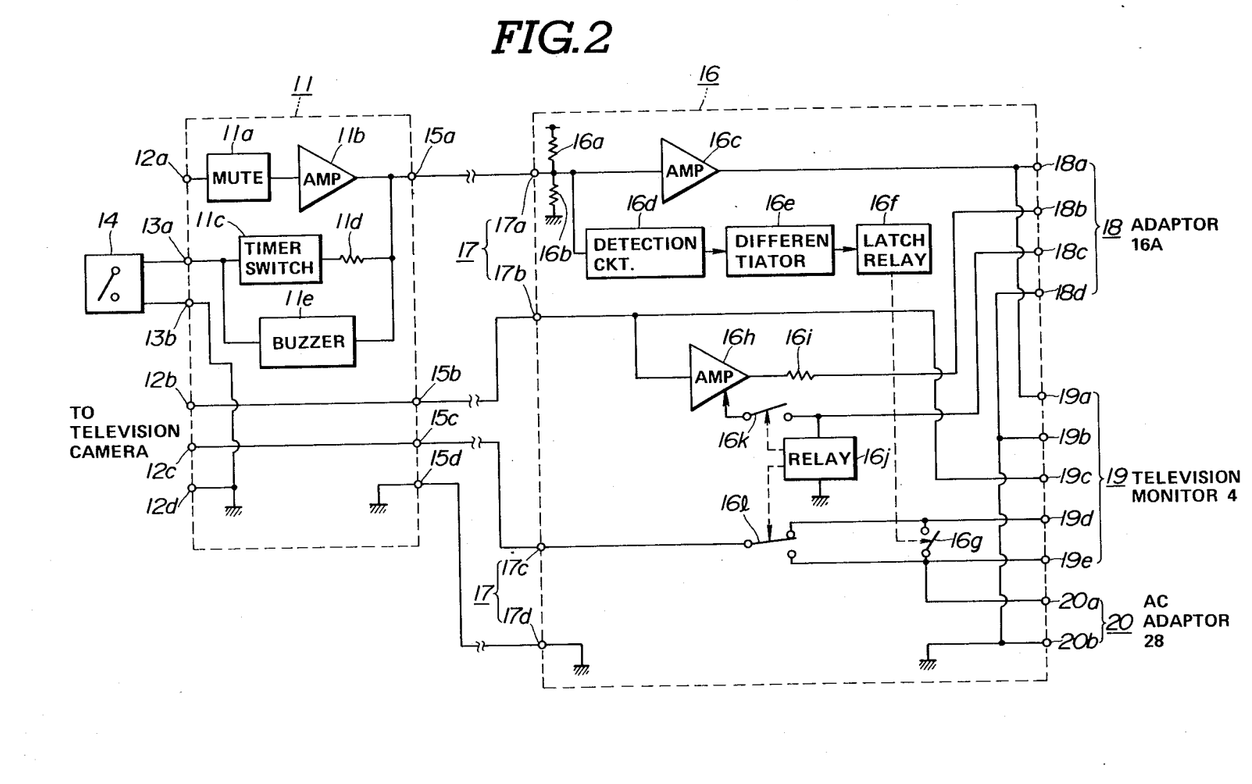
FIG. 2 is a circuit connection diagram of an adaptor and rosette shown in FIG. 1.

FIG. 2 shows the internal circuit configuration of the rosette 11 and the first adaptor 16.

The rosette 11, as shown in FIG. 2, includes connection terminals 12a, 12b, 12c and 12d to which the television camera 1 is connected, connection terminals 13a and 13b to which an infrared switch 14 to be described later is connected, and connection terminals 15a, 15b, 15c, and 15d to which the first adaptor 16 is connected. The connection terminal 12a is an audio signal input terminal. The connection terminal 12b is a video input terminal. The connection terminal 12c is an output terminal of the power supply (+B). The connection terminal 12d is a ground terminal. The connection terminal 15a is an audio signal output terminal. The connection terminal 15b is a video signal output terminal. The connection terminal 15c is an input terminal of the power supply (+B). The connection terminal 15d is a ground terminal. The connection terminal 13a connected to an infrared switch 14 is an input terminal for a detection signal derived from the infrared switch 14. The connection terminal 13b is a ground terminal. The infrared switch 14 is a sensor having a switch which closes when detecting an entrance of, e.g., a human being within a predetermined range. When the infrared switch 14 closes, the detection signal is transmitted to the detection signal input terminal 13a. The detection signal input terminal 13a is connected to the audio signal output terminal 15a via a series circuit having a timer switch 11c and a resistor 11d and via a buzzer 11e connected in parallel to the series circuit constituted by the timer switch 11c and the resistor 11d. The audio signal input terminal 12a is connected to the audio signal output terminal 15a via a mute circuit 11a and an amplifier 11b. Furthermore, the video signal output terminal 15b is connected to the video signal input terminal 12b. The power supply input terminal 15c is connected to the power supply output terminal 12c. It is noted that the power supply (+B) received via the power supply input terminal 15c is distributed to each circuit in the rosette 11 requiring the power supply voltage.

The audio signal output terminal 15a outputs the audio signal derived from the television camera 1 amplified by means of the amplifier 11b.

The audio output terminal 15a also receives a constant minute DC current which is supplied through the buzzer 11e and the timer switch 11c to the terminal 13a and to the infrared switch 14 for operation thereof. When the infrared switch 14 is in the "on" condition, the voltage output 13a is grounded, the ground terminal 13a causing an increase in the current supplied from terminal 15a to the buzzer 11e, the timer switch 11c, and the infrared switch 14. This increase is hereinafter refered to as a detection signal.

When the detection signal is supplied by the timer switch 11c, it energizes the buzzer 11e and the timer switch 11c. The timer switch 11c is normally in a high resistance condition. When a given period of time has passed after initially receiving the detection signal the timer switch 11c is switched to a low resistance condition in which its resistance is lower than that of the buzzer 11e. Since the buzzer 11e and the timer switch 11c are wired in parallel, this causes; the buzzer 11e to be deenergized. Thus, the detection signal causes the buzzer to be activated for a predetermined period of time.

Next, the first adaptor 16 includes: (a) a connection terminal group 17 connected to the rosette 11; (b) a connection terminal group 18 connected to the second adaptor 16a; (c) a connection terminal group 19 connected to the first monitor television 4; and (d) a connection terminal group 20 connected to an AC adaptor 28 shown in FIG. 1. The connection terminal group 17 has four connection terminals 17a, 17b, 17c, and 17d. The connection terminal 17a is an audio signal input terminal. The connection terminal 17b is a video signal input terminal. The connection terminal 17c is a power supply (+B) output terminal. The connection terminal 17d is a ground terminal. The connection terminal group 18 has four connection terminals 18a, 18b, 18c, and 18d. The connection terminal 18a is an audio signal output terminal. The connection terminal 18b is an amplified video output terminal. The connection terminal 18c is a power supply (+B) input terminal. The connection terminal 18d is a ground terminal. The connection terminal group 19 has five connection terminals 19a, 19b, 19c, 19d, and 19e. The connection terminal 19a is an audio signal output terminal. The connection terminal 19b is a ground terminal. The connection terminal 19c is a video signal output terminal. The connection terminal 19d is a power supply (+B) input terminal. The connection terminal 19e is a power supply (+B) output terminal. The connection terminal group 20 has two connection terminals 20a, 20b. The connection terminal 20a is a power supply (+B) input terminal. The connection terminal 20b is a ground terminal.

The audio signal input terminal 17a is connected to the audio signal output terminal 18a via an amplifier 16c and to a series circuit including a DC level change detection circuit 16d, a differentiator 16e, and a latch relay circuit 16f.

The audio signal output terminals 18a, 19a receive the audio signal from, e.g., a microphone installed on the television camera 1 through the amplifier 16c. The audio signal is derived from the input terminal 17a. The DC detector 16d detects the detection signal superposed on the audio signal, i.e., a DC signal by means of the rosette 11. The detection signal is supplied to the latch relay circuit 16f via the differentiator 16e. When the detection signal is transmitted to the latch relay circuit 16f, the switch circuit 16g which will be described later is closed. The audio signal input terminal 17a is connected to an intermediate point between two resistors 16a, 16b connected between the power supply (+B) and ground. Therefore, the infrared switch 14 receives the minute voltage divided by the two resistors 16a, 16b. The audio signal input terminal 17a thus always outputs a constant level of DC voltage.

The video signal input terminal 17b is directly connected to the video signal output terminal 19c for the monitor television 4 and connected to the video signal output terminal 18b for the second adaptor 16A via a video amplifier 16h and resistor 16i. The drive power supply of the amplifier 16h is the power supply (+B) derived at the power supply input terminal 18c and supplied from the second adaptor 16A. The power supply input terminal 18c is connected to a switch circuit 16k which is turned on or off according to an open or a close operation of a relay circuit 16j. The switch circuit 16k is connected to a bias supply of the amplifier 16h so that the relay circuit 16j closes the switch circuit 16k when the power supply appears at the above-described power supply input terminal 18c. The switch circuit 16k thus passes the power supply derived from the second adaptor 16A to the amplifier 16h so that the video signal amplified by means of the amplifier 16h is outputted via the video signal output terminal 18b to the next stage component, i.e., the second adaptor 16A. In addition, the relay circuit 16j performs the switching of another switch circuit 16l which will be described later in cooperation with the above-described switch circuit 16k.

On the other hand, the power supply input terminal 20a is directly connected to the power supply output terminal 19e for the monitor television 4 and is connected to a normally open contact side of the switch circuit 16l controlled by means of the relay circuit 16j described above. Furthermore, the power supply input terminal 20a is connected to a normally closed contact side of the switch 16l via the switch circuit 16g. A normally closed contact side of the switch circuit 16l is connected to the power supply output terminal 17c and to the power supply input terminal 19d.

The power supplied to the adaptor 16 is supplied from the power supply input terminal 19d via the monitor television 4. The power supply input terminal 19d can transmit the power supply to the normally closed contact of the switch circuit 16l only while a power supply switch (not shown) of the monitor television 4 is in the on state. The power supply is thus not received when the monitor television 4 is in the off state. The power is supplied from the AC adaptor 28 to the output terminal 17c connected to the rosette 11 either when the switch circuit 16g is in the closed state so that the AC adaptor 28 is connected to the output terminal 17c via the switch circuit 16l or when a movable contact of the switch circuit 16l is switched to the normally open contact thereof so that the AC adaptor 28 is connected to the output terminal 17c via the input terminal 20a.

Each of the next stage adaptors, each having the construction described above, is connected in the same way as shown in FIG. 1. The four connection terminals 17a through 17d in the connection terminal group 17 of the first adaptor 16 are connected to the connection terminal group 15 of the rosette 11 via the cable 22 including four signal lines 15a through 15d. The four connection terminals 18a through 18d of the connection terminal group 18 are connected to a connection terminal group 17A of the second adaptor 16A via the cable 23. It is noted that the construction of the second adaptor 16A is substantially the same as that of the first adaptor 16. Alternatively, the second adaptor 16A may eliminate the circuit elements 16a, 16b, 16d, 16e, 16f, and 16g.

The five connection terminals 19a through 19e of the connection terminal group 19 of the adaptor 16 are connected to a signal input/output terminal portion of the first monitor television 4 via the cable 24 having four signal lines and the DC cable 25. It is noted that the DC cable 25 is connected across the connection terminals 19d, 19e from which the power supply of the AC adaptor 28 is transmitted. The AC adaptor 28 is connected across the two connection terminals 20a and 20b. The connection terminal group 12, i.e., 12a to 12d of the rosette 11 is connected to a connection terminal part 1a of the television camera 1 via the cable 21 having four signal lines. In addition, the second adaptor 16A is connected to the second monitor television 6 via the cable 26 and the DC cable 27. A connection terminal part 20A is connected to the associated AC adaptor 29. When another monitor television is connected to the monitor televisions 4, 6, the connection terminal part 18A of the second adaptor 16A is connected to a third adaptor (not shown) having a similar construction to that described above, by means of which the other monitor televisions can finally be connected to the television camera 1.

The monitoring system is constructed as described above using the adaptors 16, 16A. For example, in a case where the system employed as the security system to monitor a visitor at a door of a house, the infrared switch 14 connected to the rosette 11 detects the presence of the visitor. When the infrared switch 14 detects the presence of the visitor, power is supplied to the television camera 1 and all monitor televisions connected to the television camera 1. Specifically, when the infrared switch 14 detects the presence of the visitor, the detection signal is superposed on the audio line by the rosette 11. The DC level change detection circuit 16d of each adaptor 16, 16A detects the DC voltage signal and the latch relay 16f closes the switch circuit 16g. Therefore, power is supplied, e.g., from the AC adaptor 28 to an apparatus in the circuit on the camera side of each adaptor 16, 16A. The apparatus on the camera side of the first adaptor 16 is the rosette 11. The power supply from the AC adaptor 28 is supplied to the television camera 1 via the rosette 11. Since the apparatus on the camera side of the second adaptor 16A, i.e., the prior stage component of the second adaptor 16A is the first adaptor 16, the power supply is supplied to the relay 16j of the first adaptor 16. When the power supply from the AC adaptor 29 is supplied to the amplifier 16h, the video signal amplified by means of the amplifier 16h is supplied to the second adaptor 16A. In this way, each component in the monitoring system receives a power supply.

In cases where the image is to be displayed on only the first monitor television 4, the power for the camera, the rosette and the monitor that is to be used are supplied via the adaptor 16 from the AC adaptor 28 only.

Therefore, since power is not supplied from the second adaptor 16A, amplification by means of the amplifier 16h is not carried out. The power is supplied from the first adaptor 16 to the first monitor television 4, the rosette and to the television camera 1 only. Thus monitoring is carried out by means of the first monitor television 4 only.

On the other hand, in cases where the monitoring is carried out only by means of the second monitor television 6, power is supplied from the second adaptor 16A to the first adaptor 16. As described above, the video signal amplified by means of an amplifier 16h is supplied to the second monitor television 6. The relay 16j switches the switch circuit 16l so that the power supply from the AC adaptor 28 is supplied to the television camera 1. In this way, the monitoring is carried out through only the second monitor television 6.

As described above, the adaptor 16 in the present invention only supplies DC power to the television monitor connected to its output terminal group 19 or a device connected to its camera side terminal group 17; it does not supply power to a device, such as the second adaptor 16A, connected to its second output terminal group 18. Therefore the adaptor need not have a large current output capacity. For example, the AC adaptor (convertor) 28 supplying the power supply to the first adaptor 16 may have an output of approximately 750 mA, since current consumed by the television camera is approximately 150 mA and that consumed by the television monitor is approximately 600 mA. Since it must supply power for the amplifier 16h, the power supply of the second adaptor 16A will output slightly more (about 30 mA) than that of the first adaptor 16.

Figure 3:
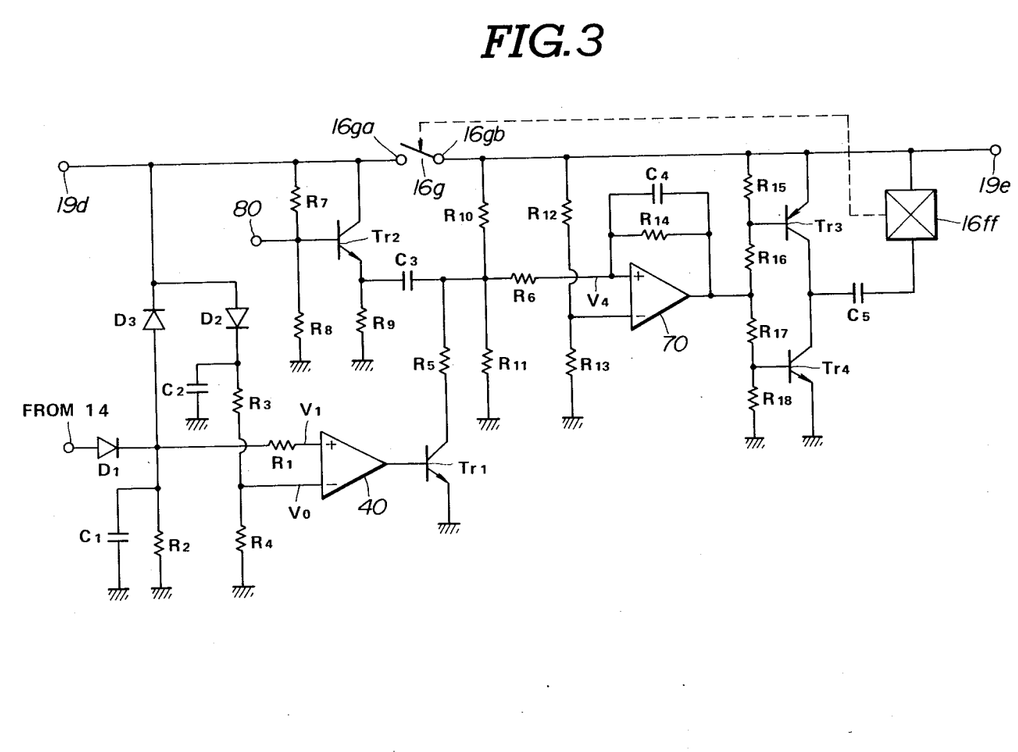
FIG. 3 is a circuit wiring diagram of a latch relay circuit shown in FIG. 2.
Figure 4A:
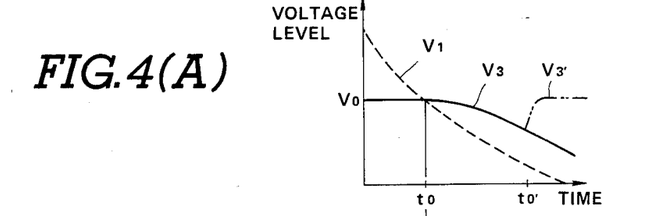
FIGS. 4(A) through 4(F) are characteristic graphs of respective signals in the latch relay circuit shown in FIGS. 2 and 3.
Figure 4B:
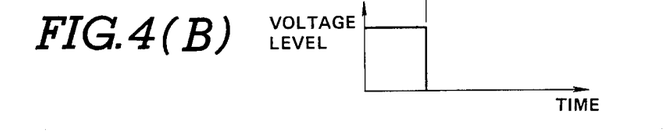
Figure 4C:
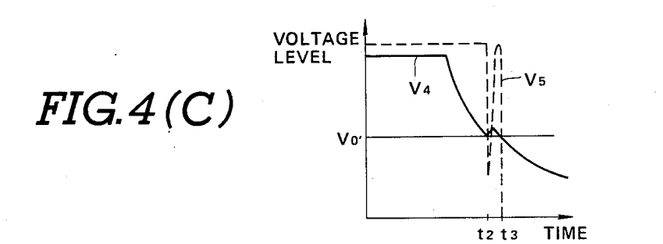
Figure 4D:
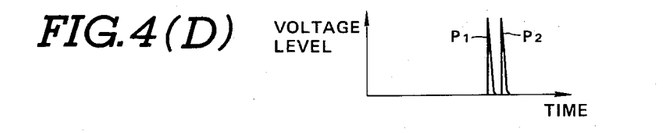
Figure 4E:
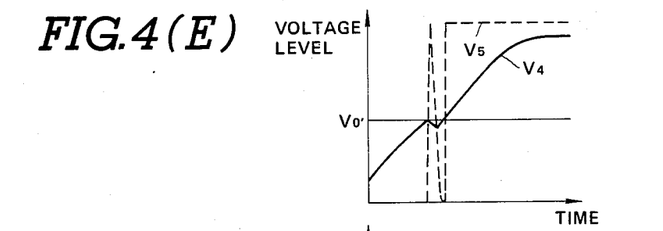
Figure 4F:
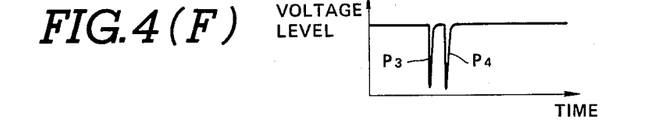

FIGS. 3 through 4(F) show an example and detailed operation of the latch relay circuit 16f of the adaptor 16.

As shown in FIG. 3, a resistor $R_3$ is connected to the output terminal 19d (representing the power supply input terminal shown in FIG. 1) via a the diode $D_2$. An intermediate point between the resistor $R_3$ and diode $D_2$ is grounded via a capacitor $C_2$. The diode $D_2$ is connected to the resistor $R_3$ so that an electric current flows from the output terminal 19d to the resistor $R_3$. The resistor $R_3$ and the capacitor $C_2$ constitute a time constant circuit. It is noted that the time constant circuit comprising the resistor $R_3$ and the capacitor $C_2$ is set to have a longer time constant than the time constant circuit comprising the resistor $R_2$ and capacitor $C_1$. An intermediate point between the diode $D_1$ and the resistor $R_1$ is connected to the output terminal 19d via a diode $D_3$ so that an electric current flows from the diode $D_1$ to the output terminal 19d. A signal input part of a first operational amplifier 40 is constituted by these resistors, capacitors, and diodes. A circuit for actuating the latch relay circuit 16ff in response to an output signal of the first operational amplifier 40 is connected between the output terminal of the first operational amplifier 40 and the latch relay circuit 16ff. The output terminal of the first operational amplifier 40 is connected to a base of an NPN type first transistor $Tr_1$. An emitter of the first transistor $Tr_1$ is grounded. A collector of the first transistor $Tr_1$ is connected to a non-inverting input terminal of a second operational amplifier 70 via a series circuit of resistors $R_5$ and $R_6$. In FIG. 3, numeral 80 denotes an input terminal at which the DC voltage signal having a predetermined level is supplied. The input terminal 80 is connected to a base of a NPN type second transistor $Tr_2$. The output terminal 19d is grounded via the series circuit of the resistors $R_7$ and R9. An intermediate point of the resistors R7 and R8 is connected to the input terminal 80. A collector of the second transistor Tr2 is connected to the output terminal 19d. An emitter of the second transistor Tr2 is connected to an intermediate point between the resistors R5 and R6 via a capacitor C3 and is grounded via the resistor R9. One terminal 16ga of the switch circuit 16g is connected to the output terminal 19d. The other terminal 16gb of the switch circuit 16g is connected to a plus side (+) of a power supply, i.e., 19e shown in FIG. 3. A terminal 16gb of the switch circuit 16g is grounded via a series circuit of resistors R10 and R11. An intermediate point between the resistors R5 and R6 is connected to an intermediate point of the resistors R10 and R11. In addition, a terminal 16gb of the switch circuit 16g is grounded via a series circuit constituted by resistors R12 and R13. An intermediate point between resistors R12 and R13 is connected to an inverting input terminal (−) of the second operational amplifier 70. A non-inverting input terminal (+) of the second operational amplifier 70 is connected to an output terminal of the second operational amplifier 70 via a parallel circuit of a resistor R14 and capacitor C4. The terminal 16gb of the switch circuit 16g is grounded via the series circuit of resistors R15, R16, R17, and R18. An intermediate point between resistors R16 and R17 is connected to an output terminal of the second operational amplifier 70. An intermediate point between resistors R16 and R17 is connected to a base of a third transistors Tr3. An intermediate point between resistors R17 and R18 is connected to a base of a NPN fourth transistor Tr4. An emitter of the third transistor Tr3 is connected to the terminal 16gb of the switch circuit 16g. An emitter of the fourth transistor Tr4 is grounded. The collectors of the third and fourth transistors Tr3 and Tr4 are connected to one terminal of the latch relay circuit 16ff via a capacitor C5. The other terminal of the latch relay circuit 16ff is connected to the terminal 16gb of the switch circuit 16g.

As shown by a dotted line of FIG. 4(A), when a pulse signal associated with an on signal of the infrared switch 14 is received at the input terminal 13a shown in FIG. 2, a signal whose level gradually decreases is produced at the non-inverting input terminal of the first operational amplifier 40 by means of the time constant circuit having the resistor R2 and capacitor C1.

Since the resistor R3, the circuit element supplying a reference voltage signal $V_o$ to the inverting input terminal of the first operational amplifier 40 constitutes the time constant circuit together with the capacitor C2, the signal $V_1$ produced at the non-inverting input terminal of the first operational amplifier 40 becomes lower than the reference voltage $V_o$. Then, when the latch relay circuit 16ff opens the switch circuit 16g to interrupt the power supply, the signal $V_3$ produced at the inverting input terminal of the first operational amplifier 40 is not abruptly reduced to zero volts and the voltage level of the signal $V_3$ gradually reduces. The time constant circuit located with the inverting input terminal (i.e., the circuit comprising the resistor R3 and capacitor C2) has a longer time constant. Therefore, after a time $t_o$ at which the power supply is interrupted, the signal $V_3$ produced at the inverting input terminal of the first operational amplifier 40 has a voltage level which is always higher than the signal $V_1$ produced at the non-inverting input terminal thereof.

Therefore, before the signal $V_1$ produced at the non-inverting input terminal of the first operational amplifier 40 becomes zero volts, even if a manual switch (not shown) is forcibly turned on to supply the power supply to the output terminal 19d, a high level signal from the first operational amplifier 40 is not outputted from the first operational amplifier 40. That is to say that, as shown in FIG. 4(A), even if the power supply is turned on at a time $t_o'$ prior to zero volt of the signal $V_1$, a signal $V_3'$ produced at the inverting input terminal thereof merely becomes the reference voltage $V_o$ and there is no pulse outputted therefrom, as show FIG. 4(B). Therefore, with the switch circuit 16g being closed, the power supply can be turned off by means of the circuit 16g. If the manual switch is turned off, there is no supply of power at the output terminal 19d and it becomes an off state.

When the latch relay circuit 16ff is activated in response to the output signal of the first operational amplifier 40, the latch relay circuit 16ff is ensuredly operated. That is to say, when the high-level output signal is produced at the first operational amplifier 40, the voltage level $V_4$ of the signal derived at the non-inverting input terminal of the second operational amplifier 70 gradually reduces from the output signal level of the first operational amplifier 40 during the time determined by a time constant circuit comprising the capacitor C3, and resistors R5, R10, and R11.

It is noted that when the voltage level $V_4$ becomes lower than the voltage level $V_o'$ at the inverting input terminal of the second operational amplifier 70 which is divided by the resistors R12 and R13 (t2 of FIG. 4(A)), the voltage level $V_5$ of the output signal of the second operational amplifier 70 is inverted from the high level to the low level. At this time, the third transistor Tr3 is turned on so that a pulse signal $P_1$ to close the switch circuit 16g as shown in FIG. 4(B) is supplied to the latch relay circuit 16ff. When the pulse signal $P_1$ is supplied to the relay circuit 16ff to close the switch circuit 16g, the electric potential of the second transistor Tr2 is increased to increase the voltage level of the signal supplied to the non-inverting input terminal of the second operational amplifier 70. Thus, the output signal level of the second operational amplifier 70 is inverted to go to a high level.

However, since the voltage level supplied to the non-inverting input terminal of the second operational amplifier 70 becomes lower than that of the time constant circuit, the voltage level becomes lower than the reference voltage level $V_o'$ so that the output signal level is again inverted to a low level. The third transistor Tr3 is again turned on to produce an on pulse signal $P_2$ (refer to FIG. 4(D)). Since at this time the power supply is already carried out and the electric potential of the second transistor Tr2 is stable, no inversion of the output signal of the second operational amplifier 70 occurs as in the case of the first pulse signal $P_1$ and the whole circuit becomes stable. Since the pulse signals $P_1$, $P_2$ are supplied to the latch relay circuit 16ff twice consecutively, the circuit 16f shown in FIG. 3 is operated stably without influence of the time constant circuits. When the switch circuit 16g is opened by the latch relay circuit 16ff, as shown in FIGS. 4(E) and 4(F), the output/input signals of the second operational amplifier 70 is varied so that the pulse signals $P_3$, $P_4$ which open the switch circuit 16g are supplied to the latch relay circuit 16ff. Thus, the operations of the whole circuit 16f shown in FIG. 3 become stable.

Since the monitoring system according to the present invention uses one adaptor for one monitor television, all television monitors receive power supplies when the power supply on signal is supplied to the respective adaptors from a system component at a prior stage thereto so that the television monitors can be controlled from the television camera side. In addition, since the video signal is amplified and supplied to the next stage component when the power supply on signal is supplied to the apparatus at the later stage, each monitor television side can also control over the television camera side to display an image.

It will fully be appreciated by those skilled in the art that the foregoing description is made in terms of the preferred embodiment and various changes and modifications may be made without departing from the scope of the present invention which is to be defined by the appended claims.

What is claimed is:

1. A video monitoring system, comprising:
   (a) at least one television camera;
   (b) at least a first television monitor;
   (c) a first DC power supply for the television monitor; and
   (d) a first adaptor for connecting the television camera to the television monitor, the first adaptor including,
   (e) first means for transmitting the first DC power supply to the first television monitor;
   (f) second means for transmitting the first DC power supply to a prior stage component of the first adaptor in the monitoring system via the first television monitor;
   (g) third means for transmitting a command signal to feed a power supply for the television camera from the first DC power supply;
   (h) fourth means for feeding the first DC power supply via the prior stage component of the first adaptor to the television camera in response to the command signal transmitted by the third means; and
   (i) fifth means for transmitting the video signal of the television camera from the prior stage component to the television monitor.

2. The monitoring system according to claim 1, wherein the prior stage component is a rosette, the rosette comprising:
   (a) sixth means for transmitting an audio signal derived from the television camera to the third means so as to superpose the audio signal on the command signal;
   (b) seventh means for transmitting the command signal derived from detecting means for detecting an entrance of a human being in a monitored area together with the audio signal to the third means of the first adaptor.
   (c) eighth means for transmitting the video signal from the television camera to the fourth means of the first adaptor; and
   (d) ninth means for transmitting the power supply of the television camera from either of the second or fourth means to the television camera.

3. The monitoring system according to claim 2, wherein the detecting means is an infrared switch which closes when the human being enters the monitored area and wherein the seventh means includes a buzzer which sounds in response to the closure of the infrared switch and a timer switch for activating the buzzer for a predetermined period of time.

4. The monitoring system according to claim 3, wherein the television camera is installed so as to produce a video signal of the human being in the monitored area.

5. The monitoring system according to claim 3, wherein a DC voltage having a predetermined level is applied from an AC adaptor to the infrared switch.

6. The monitoring system according to claim 5, wherein the third means comprises: an amplifier for amplifying the audio signal from the television camera via the seventh means; a DC level change detection circuit for detecting the DC level change of the infrared switch; a differentiator for producing a differential signal in response to the DC level change of the DC level change detection circuit; a latch relay circuit which produces a latch signal in response to the differential signal; and a switch circuit which closes in response to the latch signal from the latch relay circuit so that the DC power supply is transmitted to the television camera via the ninth means of the rosette.

7. The monitoring system according to claim 5, which further includes a second adaptor connected to the first adaptor, a second DC power supply, and a second televison monitor, the second adaptor, second DC power supply, and the second television monitor having the same constructions as the first adaptor, the first DC power supply, and the first television monitor, and wherein the second adaptor further comprises: (a) tenth means for receiving the DC power supply transmitted from the second adaptor and for transmitting and amplifying the video signal of the television camera transmitted by the fifth means to the second adaptor and simultaneously transmitting the DC power supply of the AC adaptor to the ninth means of the rosette upon receipt of the DC power supply transmitted from the second adaptor; and (b) eleventh means for transmitting the amplified audio signal of the amplifier of the third means to the second adaptor.

8. A video monitoring system, comprising: at least one television camera, a plurality of television monitors, and AC adaptors each for converting an AC voltage to a DC voltage and supplying the DC voltage to on associated television monitor, and a plurality of adaptors, each adaptor connecting the television camera to the associated television monitor via a prior stage component of the monitoring system and to a next stage adaptor, at least one of the adaptors including:
   (a) first means for transmitting the DC power supply of the associated AC adaptor to the associated television monitor;
   (b) second means for transmitting the DC power supply of the associated AC adaptor to the prior stage component via the associated television monitor;
   (c) third means for transmitting and amplifying an audio signal of the television camera to the associated television monitor and to the next stage adaptor;
   (d) fourth means for receiving the DC power supply from the next stage adaptor and for transmitting and amplifying a video signal of the television camera to the next stage adaptor and transmitting the associated DC power supply of the AC adaptor to the prior stage component upon receipt of the DC power supply from the next stage adaptor; and
   (e) fifth means for transmitting the video signal of the television camera from the prior stage component to the associated television monitor.

9. The monitoring system according to claim 8, wherein one of the adaptors which is nearest to the associated television monitor further comprises sixth means for receiving a command signal from the previous stage component to turn on the power supply for the television camera from the DC power supply of the associated AC adaptor and seventh means for transmitting the power supply from the associated AC adaptor to the television camera via the prior stage component upon receipt of the command signal from the prior stage component by the sixth means.

10. The monitoring system according to claim 9, wherein the sixth means is included in the third means so that the command signal is superposed on the audio signal.

11. The monitoring system according to claim 9, which further comprises eighth means for generating and outputting the command signal when a human being is present in a monitored area of the television camera.

12. An adaptor for a video monitoring system, comprising:
 (a) first means for transmitting power supply from an AC adaptor for converting an AC voltage into a DC voltage to a television monitor connected to the adaptor;
 (b) second means for transmitting the power supply from the AC adaptor to a prior stage component in the monitoring system;
 (c) third means for transmitting an audio signal of a television camera and a command signal from the first stage component to turn on a power supply for the television camera to a next stage component;
 (d) fourth means for directly transmitting the power supply to the prior stage component when the third means transmits the command signal to the next stage component;
 (e) fifth means for receiving the power supply from the next stage component and for amplifying and transmitting a video signal of the television camera from the prior stage component to the next stage component and directly transmitting the power supply from the AC adaptor to the prior stage component when the power is supplied from the next stage component; and
 (f) sixth means for transmitting the video signal of the television camera from the prior stage component to the television monitor connected to the adaptor.

13. The adaptor according to claim 12, wherein the second means includes a normally closed contact connected to the television monitor through a first connection terminal and a movable contact connected to the television camera via a rosette constituting the prior stage component and a second connection terminal, whereby when the normally closed contact is connected to the movable contact with the power supply of the television monitor turned on, the power supply of the AC adaptor is transmitted to the rosette and television camera.

14. The adaptor according to claim 13, wherein the movable contact of the second means remains connected to the normally closed contact when the fifth means receives no power supply from the next stage component.

15. The adaptor according to claim 12, wherein the third means includes seventh means for detecting the command signal and outputting a detection signal indicative thereof to the fourth means and wherein the fourth means comprises a switch circuit for connecting the AC adaptor to the prior stage component to transmit the power supply of the AC adaptor to the prior stage component in response to the detection signal outputted seventh means.

16. The adaptor according to claim 13, wherein the fifth means comprises a relay circuit, a first relay switch, a normally open contact and an amplifier, the relay circuit closing the first relay switch so that the amplifier amplifies the video signal from the prior stage component and driving the movable contact of the second means to be connected to the normally open contact so that the power supply from the AC adaptor is transmitted to the prior stage component when the power supply is received from the next stage component.

17. The adaptor according to claim 16, wherein the command signal is generated by an infrared sensor for detecting a presence of an foreign object within a predetermined range and outputted to the next stage component of the television camera and the television camera is located so as to produce the video signal of the foreign object within the predetermined range.

18. An adaptor for a video monitoring system, comprising:
 (a) a first connection terminal group via which a video signal of a television camera from a prior stage component of the monitoring system is transmitted to the adaptor and via which a power supply command signal from the prior stage component is transmitted to the adaptor;
 (b) a second connection terminal group via which the video signal passed through the first connection terminal group is transmitted to a television monitor connected to the adaptor, and via which a power supply is transmitted to the television monitor; and
 (c) a third connection terminal group via which the video signal from the prior stage component is transmitted to a next stage component of the monitoring system, via which the power supply command signal is transmitted to the next stage component, and via which a power supply from the next stage component is received so that the power supply for the prior stage component is transmitted to the prior stage component via the first connection terminal group, and the third connection terminal group transmitting the video signal of the television camera via the first connection terminal group to the next stage component with amplification by means of an amplifier which receives the power supply therefor via the third connection terminal group from the next stage component.

19. A television monitoring system, comprising:
 (a) a television monitor;
 (b) a television camera for producing a video signal; and
 (c) an adaptor disposed in the circuit between said television monitor and the television camera the adaptor being operable for directing power from a power supply to said camera and to the television monitor, the adaptor including:
 (d) first means for transmitting power from a first power supply to the television monitor;
 (e) second means for transmitting power from the first power supply to the television camera;
 (f) third means for transmitting a video signal from the television camera to the television monitor;

(g) fourth means operable upon receiving a command signal to activate first and second means to output power;

(h) fifth means for transmitting a video signal from the television camera to a second adaptor or other device;

(i) sixth means for transmitting power supplied from a second adaptor to one of said television camera and another device disposed in a circuit between the camera and sixth means; and (j) seventh means for outputting a constant supply of power for a device disposed in the circuit between the television camera and the adaptor.

20. The monitoring system according to claim 19, wherein said constant supply of power is output from an audio input terminal of said adaptor and wherein detection means is provided for detecting variation in said power supply and producing said command signal according to said variation.

* * * * *